United States Patent [19]
Olson et al.

[11] Patent Number: 5,900,048
[45] Date of Patent: May 4, 1999

[54] RELEASE AGENT COMPOSITION FOR INDUSTRIAL APPLICATION

[75] Inventors: Richard H. Olson, Highlands Ranch, Colo.; Freeman G. Mahoney, Bismarck, N. Dak.; Dharma R. Kodali, Plymouth, Minn.

[73] Assignee: Bio-Clean, Inc., Aurora, Colo.

[21] Appl. No.: 08/741,767

[22] Filed: Nov. 5, 1996

[51] Int. Cl.$^6$ ............................. C09D 5/20; C09K 3/00
[52] U.S. Cl. ................... 106/2; 106/124.62; 106/287.25
[58] Field of Search ..................... 106/2, 187.1, 189.1, 106/198.1, 203.1, 173.01, 175.1, 205.1, 205.2, 124.1, 124.62, 287.25; 510/468

[56] References Cited

U.S. PATENT DOCUMENTS

| | | | |
|---|---|---|---|
| 3,537,869 | 11/1970 | Proell ........................................ | 106/95 |
| 3,661,605 | 5/1972 | Rubin et al. ............................. | 106/244 |
| 3,821,007 | 6/1974 | Carey ....................................... | 106/150 |
| 3,896,975 | 7/1975 | Follmer ................................... | 222/192 |
| 3,928,056 | 12/1975 | Szuhaj ..................................... | 106/243 |
| 3,962,292 | 6/1976 | Szuhaj et al. ............................. | 554/82 |
| 4,108,678 | 8/1978 | Szuhaj et al. ........................... | 106/243 |
| 4,127,419 | 11/1978 | Szuhaj et al. ........................... | 106/243 |
| 4,142,003 | 2/1979 | Sejpal ...................................... | 426/601 |
| 4,479,977 | 10/1984 | Dashiell et al. ......................... | 426/609 |
| 4,609,570 | 9/1986 | Couleau et al. ......................... | 427/135 |
| 5,186,979 | 2/1993 | Ballenger, Jr. et al. ................. | 427/156 |
| 5,194,584 | 3/1993 | Leahy ...................................... | 530/210 |
| 5,618,336 | 4/1997 | Wagner ....................................... | 106/2 |
| 5,658,374 | 8/1997 | Glover ....................................... | 106/2 |

FOREIGN PATENT DOCUMENTS 0 374 471  6/1990  European Pat. Off. .

OTHER PUBLICATIONS

Van Nieuwenhuyzen, "The Industrial Uses of Special Lecithins: A Review", JAOCS, Oct., 1981, pp. 886–888.

*Asphalt Products & Markets,* No. 563, Freedonia Study, Feb., 1994.

"Maine–Illinois Connection Makes Concrete Cleaner", AARC Report, Published Prior to Nov., 1996.

"Material Safety Data Sheet Re–Entry KNI Solvent—1000", Environmental Solvents Corporation, No. 1020, Nov. 5, 1992.

"Material Safety Data Sheet Re–Entry KNI Solvent—2000", Environmental Solvents Corporation, No. 1022, Dec. 15, 1988.

"Lecithin for Release", Central Soya Company, Inc., Copyright 1993.

*The Lecithin Book,* Central Soya Company, Inc., Copyright 1990.

"Lecithins as Emulsifiers", Central Soya Company, Inc. Copyright, 1990.

"Lecithins for Spray Application", Central Soya Company, Inc., Copyright 1993.

"Instantizing with Lecithins", Central Soya Company, Inc., Copyright 1993.

Pryde et al., "Trends in Industrial Usage for Vegetable Oils—Symposium", 75th AOCS Annual Meeting, 1984.

Aboofazeli et al. *International Journal of Pharmaceutics* 1994, 111, 63–72.

*Primary Examiner*—Kathleen K. Fonda
*Attorney, Agent, or Firm*—Nawrocki, Rooney & Sivertson, P.A.

[57] ABSTRACT

A release agent composition which is particularly suited for industrial applications such as preventing the adhesion of asphalt or concrete materials to surfaces such as truck beds, other containers, or equipment used in handling these compounds. The release agent composition includes lecithin in combination with a dispersing agent, particularly a propylene based glycol ether, a propylene based glycol ether acetate, an ethylene based glycol ether, or an ethylene based glycol ether acetate and mixtures thereof. The lecithin and dispersing agent are mixed with water to form an aqueous dispersion for application to surfaces.

20 Claims, No Drawings

RELEASE AGENT COMPOSITION FOR INDUSTRIAL APPLICATION

FIELD OF THE INVENTION

The present invention relates generally to industrial release agents and methods of releasing products from containers, tools and other surfaces. More particularly, the present invention is a lecithin based biodegradable release agent especially suitable for preventing asphalt, concrete, or polymer adhesion to containers or other equipment.

BACKGROUND OF THE INVENTION

It is generally known in many industrial operations to coat surfaces of containers, tools or other surfaces with a release agent to prevent material which comes into contact with such surfaces from adhering thereto. For example, Couleau et al. (U.S. Pat. No. 4,609,570) disclose that it is generally known in the art of molding concrete pieces, to coat mold surfaces which come into contact with the material being molded with a product which facilitates the unmolding and which attains a satisfactory surface condition for the pieces. Known release compositions generally constitute a mixture of organic solvents and petroleum products to which are added active release ingredients. Couleau et al. propose a non-petroleum based release agent for use in concrete applications, which is an aqueous antifreeze solution including a combination of at least one active release constituent which may be an organic acid salt, at least one clarifying anti-freeze agent which may be a hydroxyethylether, at least one spreading agent which is an ester, and at least one polyether lubricating agent.

Ballenger, Jr. et al. (U.S. Pat. No. 5,186,979) also disclose that in the transporting and handling of hot-mix asphalt, it is necessary to treat the dump truck or trailer with a suitable release agent to prevent the asphalt mix from sticking to the walls thereof. It is disclosed that petroleum oils have been used to coat the walls of such trucks or trailers for this purpose. Recently, however, the use of petroleum oils or other non-biodegradable materials has been criticized and even prohibited due to environmental concerns. Ballenger, Jr. et al. propose a biodegradable release agent for use in hot-mix asphalt applications which comprises preparing an aqueous dispersion of a vegetable oil which is emulsified in water using suitable emulsifiers, such as a sorbitol based emulsifier.

Leahy (U.S. Pat. No. 5,194,584) also disclose and teach the necessity for producing a non-toxic and biodegradable release agent that can be used in industrial applications. Leahy discloses a concrete release agent which comprises a small amount of tall oil uniformly dispersed in a vegetable oil as a superior concrete form release coating composition.

In industrial applications, such as described above, it is recognized that the extremely large surface areas which must be coated, along with the frequency of coating, requires that the release agent composition be inexpensive. Further, the surfaces which are coated are many times vertical, and therefore, the release agent must sufficiently coat and adhere to such vertical surfaces to function properly. Finally, as stated above, the release agent should be non-toxic and biodegradable.

Several lecithin based release agents have been disclosed for non-industrial applications. In particular, several lecithin based release agents have been disclosed as cooking surface release agents. However, it is believed that each of these compositions fail to meet one or all of the above criteria for industrial application. Some examples of lecithin based cooking release agents, include the following disclosures: 1) Sejbal (U.S. Pat. No. 4,142,003): a low viscosity lecithin vegetable oil release agent incorporating 1 to 15% of a 190 or 200 proof ethanol. 2) Szuhaj and Yaste (U.S. Pat. No. 4,108,678): a release agent consisting of lecithin, alcohol and a mixture of a triglycol esters. 3) Szuhaj and Yaste (U.S. Pat. No. 4,127,419): a release agent consisting of lecithin, triglycol esters, alcohol and water. 4) Follmer (U.S. Pat. No. 3,896,975): a lecithin emulsion applied from a pressurized system as a cooking lubricant. 5) Carey (U.S. Pat. No. 3,821,007): a lecithin containing aerosol release material comprising vegetable shortening, vegetable oil, lecithin and wheat and soybean flour. 6) Rubin et al. (U.S. Pat. No. 3,661,605): an aerosol release agent composed of a homogenized dispersion of lecithin and water.

It is readily apparent from the compositions disclosed above, that such compositions are not adequate for industrial applications, wherein large surface areas must be coated. Aerosol sprays are certainly not practical for such large volume applications. Further, the ethanol containing compositions raise flammability concerns and applicator exposure issues.

Accordingly, the need exists for a release agent composition for industrial application which is biodegradable and non-toxic. Further, the preferred agent for industrial application must be inexpensive for application to large surface areas, such as truck boxes and other industrial equipment in such industries as the asphalt industry or concrete industry. The composition must be suitable for application to vertical surfaces to provide a non-stick surface thereto upon contact by the material in the container or other equipment.

The present invention addresses these needs, as well as other problems associated with release agents for industrial applications. The present invention also offers further advantages over the prior art and solves other problems associated therewith.

SUMMARY OF THE INVENTION

The present invention is a release agent composition which is particularly suited for industrial applications. The composition is both non-toxic and biodegradable. Further, the composition is readily applied utilizing any standard spray container or equipment by an operator.

Generally, the release agent composition of the present invention comprises lecithin which is generally a mixture of phosphatides which are readily commercially available. The lecithin is combined with a dispersing or emulsifying agent which is a propylene based glycol ether, a propylene based glycol ether acetate, an ethylene glycol ether, or an ethylene glycol ether acetate. The dispersing agents can include: propylene glycol methyl ether, dipropylene glycol methyl ether, tripropylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether, diethylene glycol ethyl ether, diethylene glycol butyl ether, ethylene glycol ethyl ether acetate, ethylene glycol butyl ether acetate, diethylene glycol ethyl ether acetate, or diethylene glycol butyl ether acetate and mixtures thereof.

The above two ingredients are combined with water to form an aqueous dispersion of the release agent.

The lecithin utilized in the present composition can be a commercially available lecithin product such as EMU-FLUID™ manufactured and available from Lucas Meyer or other lecithin gum obtained from refining soybean oil. The lecithin could also include hydroxilated lecithin gums which result from treatment of lecithin with hydrogen peroxide. The lecithin can also be contained in a crude material, such as soapstock which is also a by-product of soybean oil refining. The pH of the composition can be adjusted to a preferred 7.5 to 8.0 by addition of sodium hydroxide.

The concentrations of the various components cited above will vary depending upon the particular release coating application. As one skilled in the art easily understands, additional quantities of water can be added to the present composition to dilute the concentration of lecithin and dispersing agent for those applications which require less release agent for satisfactory prevention of adhesion. Applicants have found that a mixture of one part release agent composition with 40 to 50 parts water provides a satisfactory release agent for many applications.

Preferred compositions of the release agent include about 20 weight percent to about 90 weight percent lecithin which is combined with about 3 weight percent to about 25 weight percent propylene based glycol ether, propylene based glycol ether acetate, ethylene based glycol ether, ethylene based glycol ether acetate, or mixtures thereof. The preferred dilution with water includes about 3% to about 80% water. A preferred composition of the release agent incorporates about 75% lecithin in about 20–25% glycol ether or glycol ether acetate and about 3% to about 5% water. With this preferred composition, additional dilution with water may be done by the applicator or consumer just prior to application.

These and various other advantages and features of novelty which characterize the present invention are pointed out with particularity in the claims annexed hereto and forming a part hereof. However, for a better understanding of the invention, its advantages, and the objects obtained by its use, reference should be made to the following detailed descriptive matter in which their are illustrated and described preferred embodiments and examples of the present invention.

DETAILED DESCRIPTION OF THE PREFERRED EMBODIMENTS

As required, detailed embodiments of the present invention are disclosed herein. Moreover, it is to be understood that the disclosed embodiments are merely exemplary of the present invention which may be embodied in various systems. Therefore, specific details disclosed herein are not to be interpreted as limiting, but rather as a basis for the claims and as a representative basis for teaching one skilled in the art to variously practice the present invention.

The present invention is a release agent composition which is non-toxic and biodegradable. The release agent composition comprises lecithin and a dispersing agent which can be a propylene based glycol ether, a propylene based glycol ether acetate, an ethylene based glycol ether or an ethylene based glycol ether acetate and mixtures thereof. The lecithin and dispersing agent are mixed with water to form an aqueous dispersion. The degree of dilution with water is a function of the application for which the release agent is to be utilized.

Applicants have found that the release agent of the present invention is particularly suited for industrial applications. By way of example, industrial applications can include:

The Asphalt Industry: The release agent composition is sprayed into asphalt material transport equipment so that the asphalt will not adhere to that equipment, be it hot or cold asphalt mix. The release agent composition can also be used to spray any asphalt tools or any equipment at the batch plants used in asphalt production. The product can also be used to spray hot kettles for hot tar and other tools in the roofing industry. Crack sealing equipment, as well as chip sealing equipment, paving machines, compaction rollers and asphalt emulsion spreading equipment can also be sprayed to prevent adhesion of asphalt type materials.

The Concrete Industry: The release agent composition is used to keep concrete from adhering to concrete forms by spraying such forms prior to pouring the concrete, especially small forms such as curbs and gutters. Screeds, power trowels, concrete stamping tools, mixers, dump buckets, pumping equipment, wheel barrels, paving equipment, and hand tools can also be sprayed to prevent adhesion of concrete.

Waste Management Industry: The release agent composition can be sprayed inside of garbage trucks and inside of dumpsters or compaction equipment to prevent adhesion of waste material. The composition can incorporate an agent to reduce odor from the waste material. Further, such compounds as insecticides or insect repellents may be added to containers for garbage collection.

Automotive Industry: The release agent composition can be sprayed on vehicles, such as cars, trucks, motorcycles, campers, and trailers to keep tar, bugs, mud and other unwanted substances from adhering to reduce the use of solvents and chemical compounds to clean the equipment.

The Racing Industry: The release agent composition can be used in conjunction with racing autos, tractor pulls, trucks or motorcycles to keep tar, mud and road grit from adhering to the equipment. It will be especially useful in dirt races so that mud can be washed off easily with water.

Heavy Equipment Industry: The release agent can be sprayed on bulldozers and heavy dirt moving equipment to ease removal of substances such as mud. The release agent can also be sprayed on the same type of equipment in the mining industry and for hauling of fly ash, sludge and hazardous waste to prevent adhesion of material to equipment. Snowplow removal equipment can also be sprayed with the product to prevent adhesion.

Road Construction Industry: The release agent composition can be sprayed on roads to keep dust down during construction.

Agricultural Industry: The release agent can be sprayed on equipment for hauling of agricultural products, be it vegetable or livestock. The release agent can also be applied to equipment which is utilized in processing of agricultural products.

Polymer Industry: The release agent can be utilized to spray molds to prevent sticking of molded articles upon manufacturing.

Paint Industry: The product can be used to protect areas from overspray of paint in all applications.

Household: The release agent can be utilized on lawnmowers so that grass will not clog the unit. The agent can also be used to spray garbage cans to control sticking and making cleaning of such units easier. Additional additives may be included to help control odor, insects or the like.

Fiberclass Manufacturing Industry: The release agent can be utilized to protect against overspray in manufacturing of fiberglass products.

As detailed above, the release agent disclosed herein has many industrial applications. Although these have been detailed by example, Applicants' use of the term industrial applications can also be defined as those applications which are non-food and drug applications. Industrial applications thus include those applications which are not for use in conjunction with products which are within the scope of the Federal Food, Drug and Cosmetic Act, 21 U.S.C. §301 et seq., the Federal Meat Inspection Act, 21 U.S.C. §601 et seq., the Poultry and Poultry Products Inspections ett, 21 U.S.C. §451 et seq., or the Egg Products Inspection Act, 21 U.S.C. §1031 et seq.

The lecithin utilized in the present composition can be one of many forms which are readily available. Commercially available lecithin products such as EMUFLUID™, as manufactured by Lucas Meyer can be utilized. Further, lecithin gums which are obtained from soybean oil refining can be utilized. Further, lecithin gums which have been hydroxylated with hydrogen peroxide can be utilized with increased dispersion in the water. Finally, crude material such as lecithin containing soapstocks which are a by-product of soybean oil refining can be utilized.

The lecithin is mixed with a dispersing or emulsifying agent prior to mixing with water in preferred embodiments. As previously stated, preferred dispersing agents include propylene based glycol ethers, propylene based glycol ether acetates, ethylene based glycol ethers or ethylene based glycol ether acetates and mixtures thereof. These compounds can include: propylene glycol methyl ether, dipropylene glycol methyl ether, tripropylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether, diethylene glycol ethyl ether, diethylene glycol butyl ether, ethylene glycol ethyl ether acetate, ethylene glycol butyl ether acetate, diethylene glycol ethyl ether acetate, or diethylene glycol butyl ether acetate and mixtures thereof.

The concentration of lecithin and dispersing agents in the composition of the present invention will vary with the amount of water used to dilute the composition. The dilution is a function of the application for which the composition is to be utilized. Applicants have found that release agent compositions can be diluted with 40 to 50 parts water in many applications. Preferred compositions of release agent include about 20 weight percent to about 90 weight percent lecithin dispersed in about 3% to about 25% propylene based glycol ether, propylene based glycol ether acetate, ethylene based glycol ether, or ethylene based glycol ether acetate and mixtures thereof. A preferred composition for commercial sale includes about 75 weight percent lecithin in about 22 weight percent ethylene based glycol ether, such as ethylene glycol butyl ether, which is commonly known as cellusolve. About 3 weight percent water is included in this composition. However, it is recognized that this commercial product can be easily diluted for particular applications by the purchaser or applicator.

Additional components may be added to the release coating mixture for specific applications and preferred embodiments. These components can include further emulsifiers, surfactants and coupling agents. Examples of additional components include: PAS-8 from Bio-Terge which is a primary alkane sulfonate sodium 1-octane sulfonate; Emulsifier Four from Tomah Products, Inc. which is a quaternary ammonium compound; 11-CM from NINOL which is an alkanolamide; Calsoft L-40 from Pilot Chemical Co. which is a sodium linear alkyl benzene sulfonate liquid; and Calimulse PRS from Pilot Chemical Co. which is an isopropylamine linear alkyl benzene sulfonate liquid. Mixtures or combinations of these additional components can also be utilized. A preferred composition includes 2%–6% PAS-8 and 2%–4% Emulsifier Four, with 4% of each preferred.

The present invention also encompasses a method for treating surfaces of industrial equipment to prevent adhesion of materials to the surface when they are in contact with the surface. The method includes the steps of providing a surface to be treated and providing a release agent composition as previously disclosed herein. The surface is then coated with the release agent composition prior to adding the materials which, without the agent, would adhere to the surface. The surface can include surfaces of containers such as truck beds or dumpsters for hauling such materials as asphalt, concrete, polymer or waste materials. The surface could also be on any piece of asphalt or concrete handling equipment. Further, the surface could include the surface of an automotive body, trailer body, or the surface of any piece of heavy equipment which may contact material which will adhere to the surface.

EXPERIMENTAL EXAMPLES

Example 1

Various release agent compositions of the present invention were made according to the chart below. These compositions were made by adding the specified weight of ethylene glycol butyl ether to the required weight of lecithin followed by addition of water. The composition was well mixed with a paddle mixer or agitator to make it homogenous. The formulas included:

| COMPOSITION | LECITHIN % | WATER % | ETHYLENE GLYCOL BUTYL ETHER % |
|---|---|---|---|
| A | 75.00 | 15.00 | 10.00 |
| B | 80.00 | 10.00 | 10.00 |
| C | 85.00 | 5.00 | 10.00 |
| D | 65.00 | 20.00 | 15.00 |
| E | 60.00 | 25.00 | 15.00 |
| F | 75.00 | 10.00 | 15.00 |
| G | 80.00 | 5.00 | 15.00 |
| H | 90.00 | 0.00 | 10.00 |
| I | 77.50 | 7.50 | 15.00 |
| J | 70.00 | 20.00 | 10.00 |
| K | 90.00 | 0.00 | 10.00 |
| L | 85.00 | 0.00 | 15.00 |
| M | 80.00 | 0.00 | 20.00 |
| N | 75.00 | 0.00 | 25.00 |
| O | 90.00 | 5.00 | 5.00 |
| P | 85.00 | 5.00 | 10.00 |
| Q | 80.00 | 5.00 | 15.00 |
| R | 75.00 | 5.00 | 20.00 |
| S | 70.00 | 5.00 | 25.00 |
| T | 80.00 | 10.00 | 10.00 |
| U | 75.00 | 10.00 | 15.00 |
| V | 70.00 | 10.00 | 20.00 |
| W | 75.00 | 3.00 | 22.00 |

The above compositions were tested for function as a release agent in an asphalt application. The test included determining the effect the release agent had on allowing the asphalt to stick to a simulated truck bed. Asphalt was heated to 350° F. The inside of a metal surface was coated with the release agent composition. The asphalt was placed in the pan at 350° F. and tipped at a 60° angle while the flow of the product was observed in the pan. The asphalt did not stick to the pan and very little streaking was observed. Composition W provided particularly good results. The ability to reduce adherence of the asphalt to the surface was further tested by tilting the surface 10 times while the asphalt was at 350° F. and then tilting the surface 5 more times when the asphalt was at about 250° F. The surface was then tilted one last time when the asphalt was at room temperature. The compositions, particularly composition W, was very good in preventing streaking and released the asphalt fairly easily after it cooled to room temperature.

Example 2

Several formulations of release agent were tested to optimize the shelf life of the release agent composition. Compositions according to the example below were add mixed and mechanically stirred. The physical characteristics of the mixed components were monitored, including viscosity and dispersion of components throughout the mixture. The mixtures were monitored over a period of time to determine whether the components remained dispersed in the mixture. If the separation occurred, the ease with which the constituents were redispersed was tested by stirring or mixing the formulation.

| Formula 1: | 4% | water |
|---|---|---|
| | 24% | PTB (propylene glycol t-butyl ether) |
| | 3% | DPM (dipropylene glycol methyl ether) |
| | 4% | Bio-Terge PAS-8 (primary alkane sulfonate sodium 1-octane sulfonate) |
| | 4% | Emulsifier Four (quaternary ammonium compound) |
| | 61% | Lecithin (Lecikote 8555 from Riceland Foods, Inc.) |
| Formula 2: | 3% | water |
| | 27% | PTB (propylene glycol t-butyl ether) |
| | 3% | DPM (dipropylene glycol methyl ether) |
| | 3% | Bio-Terge PAS-8 (primary alkane sulfonate sodium 1-octane sulfonate) |
| | 3% | Emulsifier Four (quaternary ammonium compound) |
| | 61% | Lecithin (Lecikote 8555 from Riceland Foods, Inc.) |
| Formula 3: | 5% | water |
| | 18% | PTB (propylene glycol t-butyl ether) |
| | 2% | DPM (dipropylene glycol methyl ether) |
| | 5% | Bio-Terge PAS-8 (primary alkane sulfonate sodium 1-octane sulfonate) |
| | 5% | Emulsifier Four (quaternary ammonium compound) |
| | 3% | 11-CM (NINOL, an alkanolamide) |
| | 62% | Lecithin (Lecikote 8555 from Riceland Foods, Inc.) |
| Formula 4: | 4% | water |
| | 21% | PTB (propylene glycol t-butyl ether) |
| | 3% | DPM (dipropylene glycol methyl ether) |
| | 4% | Bio-Terge PAS-8 (primary alkane sulfonate sodium 1-octane sulfonate) |
| | 4% | Emulsifier Four (quaternary ammonium compound) |
| | 2% | 11-CM (NINOL, an alkanolamide) |
| | 63% | Lecithin (Lecikote 8555 from Riceland Foods, Inc.) |
| Formula 5: | 5% | water |
| | 18% | PTB (propylene glycol t-butyl ether) |
| | 2% | DPM (dipropylene glycol methyl ether) |
| | 2% | CALSOFT L-40 (sodium linear alkyl benzene sulfonate liquid) |
| | 1% | CALIMULSE PRS (isopropylamine linear alkyl benzene sulfonate liquid) |
| | 2% | Emulsifier Four (quaternary ammonium compound) |
| | 2% | Bio-Terge PAS-8 (primary alkane sulfonate sodium 1-octane sulfonate) |
| | 68% | Lecithin (Lecikote 8555 from Riceland Foods, Inc.) |
| Formula 6: | 4% | water |
| | 18% | PTB (propylene glycol t-butyl ether) |
| | 2% | CALSOFT L-40 (sodium linear alkyl benzene sulfonate liquid) |
| | 1% | CALIMULSE PRS (isopropylamine linear alkyl benzene sulfonate liquid) |
| | 2.5% | Emulsifier Four (quaternary ammonium compound) |
| | 2.5% | Bio-Terge PAS-8 (primary alkane sulfonate sodium 1-octane sulfonate) |
| | 68% | Lecithin (Lecikote 8555 from Riceland Foods, Inc.) |
| Formula 7: | 6% | water |
| | 18% | PTB (propylene glycol t-butyl ether) |
| | 2% | DPM (dipropylene glycol methyl ether) |
| | 1% | CALSOFT L-40 (sodium linear alkyl benzene sulfonate liquid) |
| | 1% | CALIMULSE PRS (isopropylamine linear alkyl benzene sulfonate liquid) |
| | 2% | Emulsifier Four (quaternary ammonium compound) |
| | 2% | Bio-Terge PAS-8 (primary alkane sulfonate sodium 1-octane sulfonate) |
| | 68% | Lecithin (Lecikote 8555 from Riceland Foods, Inc.) |
| Formula 8: | 6% | water |
| | 18% | PTB (propyleneglycol t-butyl ether) |
| | 2% | DPM (dipropylene glycol methyl ether) |
| | 2% | CALIMULSE PRS (isopropylamine linear alkyl benzene sulfonate liquid) |
| | 2% | Emulsifier Four (quaternary ammonium compound) |
| | 2% | Bio-Terge PAS-8 (primary alkane sulfonate sodium 1-octane sulfonate) |
| | 68% | Lecithin (Lecikote 8555 from Riceland Foods, Inc.) |
| Formula 9: | 9% | water |
| | 18% | PTB (propyleneglycol t-butyl ether) |
| | 2% | DPM (dipropylene glycol methyl ether) |
| | 3% | CALIMULSE PRS (isopropylamine linear alkyl benzene sulfonate liquid) |
| | 68% | Lecithin (Lecikote 8555 from Riceland Foods, Inc.) |
| Formula 10: | 5% | water |
| | 18% | PTB (propylene glycol t-butyl ether) |
| | 2% | DPM (dipropylene glycol methyl ether) |
| | 1% | CALIMULSE PRS (isopropylamine linear alkyl benzene sulfonate liquid) |
| | 74% | Lecithin (Lecikote 8555 from Riceland Foods, Inc.) |

Of the above formulations, formulas 1 and 2 were found to have excellent dispersion of the constituents and very little separation upon standing. The small amount of separated material redispersed readily with very little mixing.

New characteristics and advantages of the invention covered by this document have been set forth in the foregoing description. It will be understood, however, that this disclosure is, in many respects, only illustrative. Changes may be made in details, particularly the addition of other constituents, without exceeding the scope of the invention. The invention scope is, of course, defined in the language in which the appended claims are expressed.

What is claimed is:

1. A release agent composition for industrial application comprising a mixture of:

a. lecithin, present in a concentration of at least 60 weight percent;

b. a dispersing agent selected from the group consisting of propylene glycol methyl ether, dipropylene glycol methyl ether, tripoplylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether, diethylene glycol ethyl ether, diethylene glycol butyl ether, ethylene glycol ethyl ether acetate, ethylene glycol butyl ether acetate, diethylene glycol ethyl ether acetate, and diethylene glycol butyl ether acetate and mixtures thereof; and, c. water.

2. The release agent composition of claim 1 wherein said lecithin is hydroxylated.

3. The release agent composition of claim 1 wherein said lecithin is a constituent of soapstock.

4. The release agent composition of claim 1 wherein said dispersing agent is selected from the group consisting of:

propylene glycol methyl ether, dipropylene glycol methyl ether, tripropylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether, diethylene glycol ethyl ether, diethylene glycol butyl ether, ethylene glycol ethyl ether acetate, ethylene glycol butyl ether acetate, diethylene glycol ethyl ether acetate, or diethylene glycol butyl ether acetate and mixtures thereof.

5. The release agent composition of claim 1 wherein said lecithin concentration is about 20 weight percent to about 80 weight percent.

6. The release agent composition of claim 1 wherein said dispersing agent concentration is about 5 weight percent to about 25 weight percent.

7. A release agent composition for industrial application comprising a mixture of:

a. 60 weight percent to about 90 weight percent lecithin;

b. about 5 weight percent to about 30 weight percent of a dispersing agent selected from the group consisting of propylene glycol methyl ether, dipropylene glycol methyl ether, tripropylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether, diethylene glycol ethyl ether, diethylene glycol butyl ether, ethylene glycol ethyl ether acetate, ethylene glycol butyl ether acetate, diethylene glycol ethyl ether acetate, and diethylene glycol butyl ether acetate and mixtures thereof; and, c. about 3 weight percent to about 50 weight percent water to dilute said release agent for a desired application.

8. The release agent composition of claim 7 wherein said lecithin is hydroxylated.

9. The release agent composition of claim 7 wherein said lecithin is a constituent of soapstock.

10. The release agent composition of claim 7 wherein said dispersing agent is selected from the group consisting of:

propylene glycol methyl ether, dipropylene glycol methyl ether, tripropylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether , diethylene glycol ethyl ether, diethylene glycol butyl ether, ethylene glycol ethyl ether acetate, ethylene glycol butyl ether acetate, diethylene glycol ethyl ether acetate, or diethylene glycol butyl ether acetate and mixtures thereof.

11. The release agent composition of claim 7 wherein said lecithin concentration is about 60 weight percent to about 90 weight percent.

12. The release agent composition of claim 1 wherein said dispersing agent concentration is about 15 weight percent to about 30 weight percent.

13. A method for treating a surface of industrial equipment to prevent adhesion of materials to said surface when in contact therewith comprising the steps of:

a. providing a surface to be treated;

b. providing a release agent composition wherein said release agent composition is a mixture of lecithin, a dispersing agent selected from the group consisting of propylene glycol methyl ether, dipropylene glycol methyl ether, tripropylene glycol methyl ether, propylene glycol t-butyl ether, propylene glycol methyl ether acetate, dipropylene glycol methyl ether acetate, ethylene glycol methyl ether, ethylene glycol ethyl ether, ethylene glycol butyl ether, diethylene glycol methyl ether, diethylene glycol ethyl ether, diethylene glycol butyl ether, ethylene glycol ethyl ether acetate, ethylene glycol butyl ether acetate, diethylene glycol ethyl ether acetate, and diethylene glycol butyl ether acetate and mixtures thereof and water to dilute said release agent for a desired application, wherein said lecithin has a weight concentration at least 60 percent; and, c. coating said surface with said release agent composition prior to adding said materials.

14. The method of claim 13 wherein said release agent composition comprises about 20 weight percent to about 90 weight percent lecithin, about 5 weight percent to about 25 weight percent of said dispersing agent and about 3 weight percent to about 50 weight percent water.

15. The method of claim 13 wherein said surface is a truck bed.

16. The method of claim 15 wherein said material is selected from the group consisting of asphalt, concrete, polymer and waste material.

17. The method of claim 13 wherein said surface is a concrete form.

18. The method of claim 13 wherein said surface is on asphalt or concrete handling equipment.

19. The method of claim 13 wherein said surface is an automotive or trailer body.

20. The method of claim 13 wherein said surface is the surface of heavy equipment.

* * * * *